(12) United States Patent
Doyle

(10) Patent No.: US 7,298,371 B2
(45) Date of Patent: Nov. 20, 2007

(54) EFFICIENT OBJECT STORAGE FOR ZONE RENDERING

(76) Inventor: Peter L. Doyle, 2532 Templeton Dr., El Dorado Hills, CA (US) 95762

( * ) Notice: Subject to any disclaimer, the term of this patent is extended or adjusted under 35 U.S.C. 154(b) by 139 days.

(21) Appl. No.: 10/848,018

(22) Filed: May 17, 2004

(65) Prior Publication Data

US 2004/0212622 A1 Oct. 28, 2004

Related U.S. Application Data

(63) Continuation of application No. 10/039,006, filed on Dec. 31, 2001, now Pat. No. 6,747,653.

(51) Int. Cl.
*G06T 15/30* (2006.01)
*G06T 15/10* (2006.01)
*G06T 17/00* (2006.01)

(52) U.S. Cl. .................. 345/423; 345/427; 345/420

(58) Field of Classification Search ............. 345/420, 345/423, 427
See application file for complete search history.

(56) References Cited

U.S. PATENT DOCUMENTS

| | | | |
|---|---|---|---|
| 4,967,375 A | 10/1990 | Pelham et al. | |
| 5,898,437 A | 4/1999 | Deolaliker | |
| 6,323,860 B1 * | 11/2001 | Zhu et al. | 345/427 |
| 6,344,852 B1 | 2/2002 | Zhu et al. | |
| 6,380,935 B1 | 4/2002 | Heeschen et al. | |
| 6,437,780 B1 * | 8/2002 | Baltaretu et al. | 345/423 |
| 6,525,737 B1 | 2/2003 | Duluk, Jr. et al. | |
| 6,577,305 B1 | 6/2003 | Duluk, Jr. et al. | |
| 6,747,653 B2 * | 6/2004 | Doyle | 345/501 |

\* cited by examiner

*Primary Examiner*—Kee M. Tung
*Assistant Examiner*—Hau H Nguyen

(57) ABSTRACT

Similar, contiguous primitives are stored as a single primitive in zone rendering bins. A primitive packet used in the bin is allowed to vary in length and the currently open type of primitive is recorded on a per-bin basis. A special code is used to specify a variable number of subsequent indices. With this mechanism, the hardware is able to start outputting and replicating primitive commands into bin lists on the fly without requiring the buffering of the entire primitive. Given the variable nature of the primitive instruction, multiple similar/sequential primitives can be concatenated using a single primitive command header.

12 Claims, 5 Drawing Sheets

| 63 | 37 | 36    34 | 33 | 32 |
|---|---|---|---|---|
| Reserved | | Bin State | Reserved | Memory Space |

| 31 | 0 |
|---|---|
| Address | Reserved |

| Bit | Description |
|---|---|
| 63..37 | Reserved : MBZ |
| 36..34 | Bin State :<br>Specifies the current status of the bin:<br>0: NOT_VALID (there is no physical page allocated for this bin - this i used to prevent the HW8 from closing an "unused" bin that is adjacent (within a BPL tile) to a valid bin.<br>1: NOT_OPEN (There is a valid page allocated to this bin. The bin is not in a state where there is an "open" (yet-to-be-terminated) primitive packet)<br>2: OPEN_POINTLIST (There is a valid page allocated to this bin. The bin contains an "open" (yet-to-be-terminated) 3D_POINTLIST primitive packet).<br>3: OPEN_LINELIST (There is a valid page allocated to this bin. The bin contains an "open" (yet-to-be-terminated) 3D_LINELIST primitive packet).<br>4: OPEN_TRILIST (There is a valid page allocated to this bin. The bin contains an "open" (yet-to-be-terminated) 3d_TRILIST primitive packet).<br>5: OPENRECTLIST (There is a valid page allocated to this bin. The bin contains an "open" (yet-to-be-terminated) 3D_RECTLIST primitive packet).<br>6-7: Reserved |
| 33 | Reserved : MBZ |
| 32 | Memory Space :<br>Specifies the physical address space associated with Address:<br>0: Local Memory<br>1: Main (unsnooped system) Memory |
| 31..1 | Address :<br>Specify Bits 31:1 of te physical Word address at which new data will be written into the bin. |
| 0 | Reserved : MBZ |

EFFICIENT OBJECT STORAGE FOR ZONE RENDERING

This application is a continuation of Ser. No. 10/039,006, filed on Dec. 31, 2001 now U.S. Pat. No. 6,747,653, entitled "Efficient Object Storage for Zone Rendering."

BACKGROUND

1. Field

The present invention relates generally to graphics systems and more particularly to graphics-rendering systems.

2. Background Information

Computer graphics systems are commonly used for displaying graphical representations of objects on a two-dimensional video display screen. Current computer graphics systems provide highly detailed representations and are used in a variety of applications. In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional objects to be rendered are defined by a host computer in terms of primitive data. For example, when the primitive is a triangle, the host computer may define the primitive in terms of X, Y and Z coordinates of its vertices, as well as the red, green and blue (R, G and B) color values of each vertex. Additional primitive data may be used in specific applications.

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine performs these graphics processing tasks. Graphics-rendering engines typically render scenes into a buffer that is subsequently output to the graphical output device, but it is possible for some rendering-engines to write their two-dimensional output directly to the output device. The graphics-rendering engine interpolates the primitive data to compute the display screen pixels that represent the each primitive, and the R, G and B color values of each pixel.

A graphics-rendering system (or subsystem), as used herein, refers to all of the levels of processing between an application program and a graphical output device. A graphics engine can provide for one or more modes of rendering, including zone rendering. Zone rendering attempts to increase overall 3D rendering performance by gaining optimal render cache utilization, thereby reducing pixel color and depth memory read/write bottlenecks. In zone rendering, a screen is subdivided into an array of zones and per-zone instruction bins, used to hold all of the primitive and state setting instructions required to render each sub-image, are generated. Whenever a primitive intersects (or possibly intersects) a zone, that primitive instruction is placed in the bin for that zone. Some primitives will intersect more than one zone, in which case the primitive instruction is replicated in the corresponding bins. This process is continued until the entire scene is sorted into the bins.

Following the first pass of building a bin for each zone intersected by a primitive, a second zone-by-zone rendering pass is performed. In particular, the bins for all the zones are rendered to generate the final image.

Conventionally, the storage of 3D primitive instruction in a bin is formatted as follows: a one 32-bit header describing the type of primitive and an explicit count of vertex indices, followed by a series of 16-bit vertex indices (with a possible trailing 16-bit pad to ensure 32-bit alignment in the bin). The explicit count in the header required knowledge of the size (i.e., number of indices) of the primitive at the time the primitive instruction is generated. The 32-bit header contributes to the bin list bandwidth and footprint requirements of zone rendering.

What is needed therefore is a method and apparatus for efficient object storage for zone rendering.

BRIEF DESCRIPTION OF THE DRAWINGS

FIG. 5 illustrates a diagram of an embodiment of information stored in a bin pointer list.

DETAILED DESCRIPTION

Figure 1:
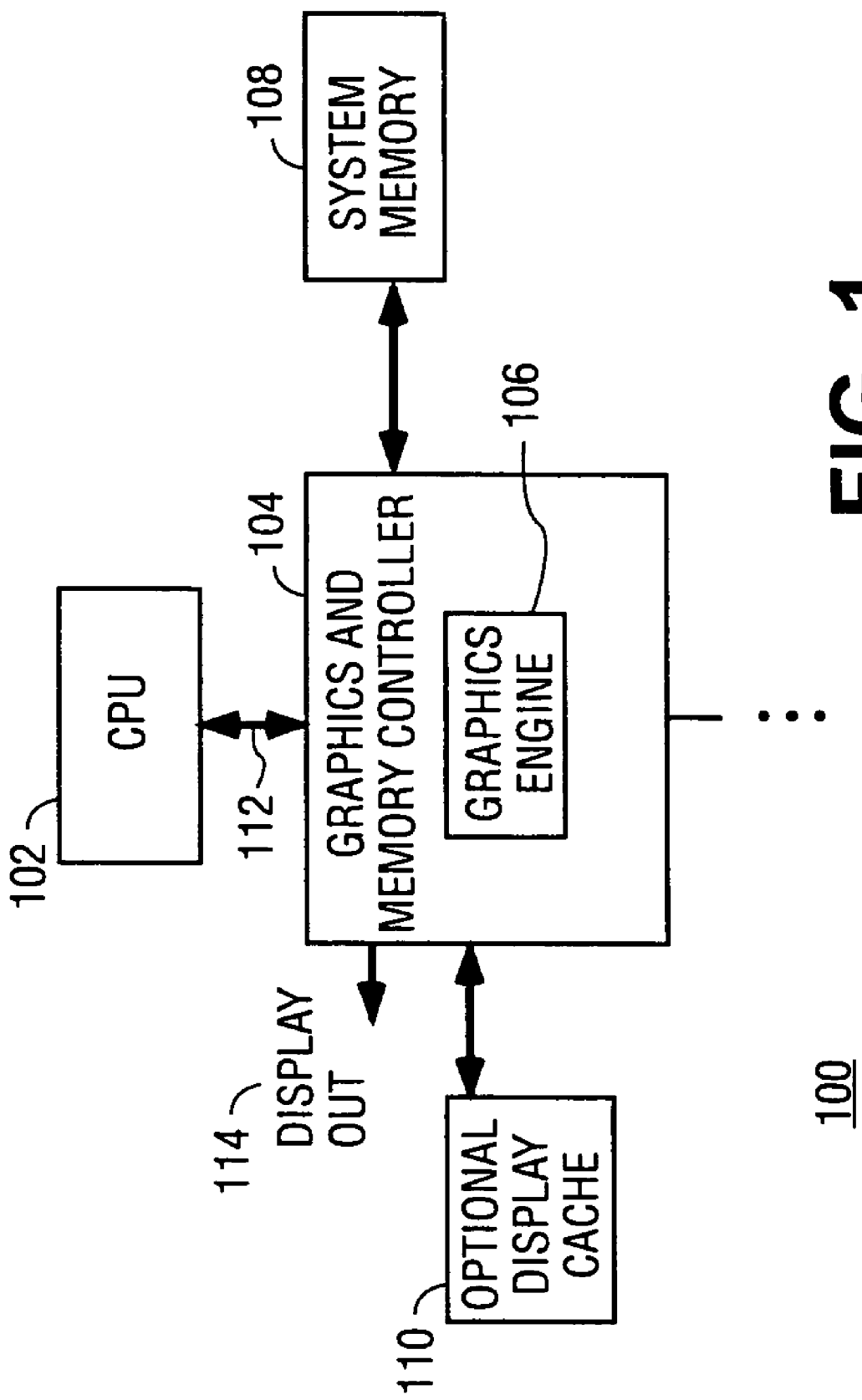
FIG. 1 illustrates a block diagram of an embodiment of a computer system including an embodiment of a graphics device for implementing efficient object storage for zone rendering.

Embodiments of the present invention provide for efficient object storage for zone rendering. In particular, similar, contiguous primitives to be stored as a single primitive in the zone rendering bins. To enable this, the primitive packet used in the bin is allowed to vary in length and the currently open type of primitive is recorded on a per-bin basis.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 1. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.™. operating system available from Microsoft Corporation, although other operating systems and graphical user interfaces, for example, may also be used.

FIG. 1 is a block diagram of a system 100 of one embodiment of the present invention. The computer system 100 includes central processor 102, graphics and memory controller 104 including graphics device 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 1 is for illustrative purposes only. The present invention can also be utilized in a configuration including a descrete graphics device.

Processor 102 issues signals over common bus 112 for communicating with memory 108 or graphics and memory controller 104 in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics device 106 or some other device. The instructions and/or data may comprise code for performing any and/or all of the techniques of the present invention. Memory 108 may also contain software and/or data. An optional cache memory 110 may be used to speed up memory accesses by the graphics device 106 by taking advantage of its locality of access. In some embodiments, graphics device 106 can offload from processor 102 many of the memory-intensive tasks required for rendering an image. Graphics device 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics device 106 may be coupled to common bus 112 that transmits data signals between graphics device 106 and other components in the system 100, including render cache 110 and display device 114. Graphics device 106 includes rendering hardware that among other things writes specific attributes (e.g. colors) to specific pixels of display 114 and draw complicated primitives on display device 114. Graphics and memory controller 104 communicates with display device 114 for displaying images rendered or otherwise processed by a graphics controller 104. Display device 114 may comprise a computer monitor, television set, flat panel display or other suitable display device.

Memory 108 stores a host operating system that may include one or more rendering programs to build the images of graphics primitives for display. System 100 includes graphics device 106, such as a graphics accelerator that uses customized hardware logic device or a co-processor to improve the performance of rendering at least some portion of the graphics primitives otherwise handled by host rendering programs. The host operating system program and its host graphics application program interface (API) control the graphics device 106 through a driver program.

Figure 2:
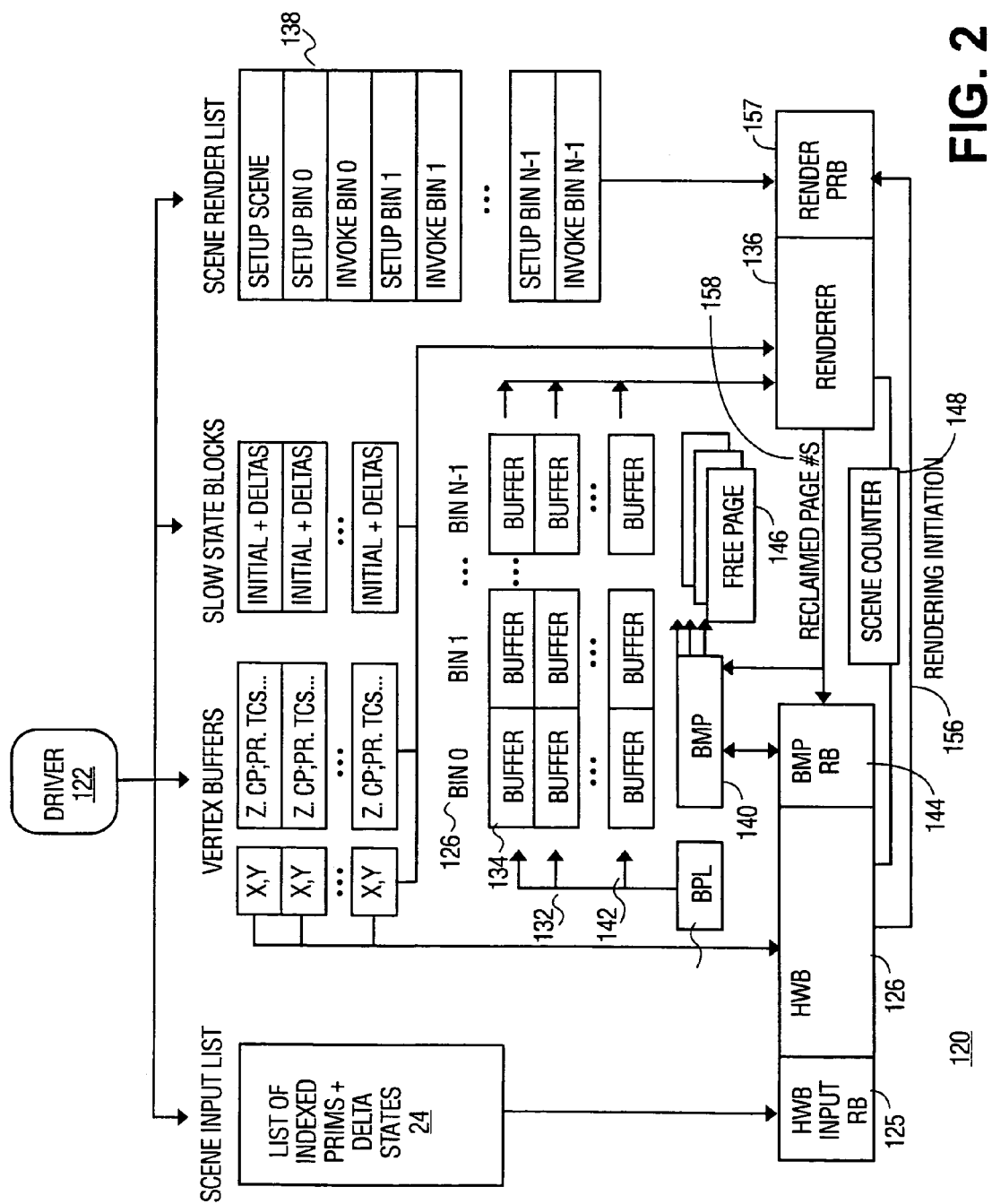
FIG. 2 illustrates a block diagram of an embodiment of a graphics device including a graphics-binning engine, graphics-rendering engine and bins.
Figure 3:
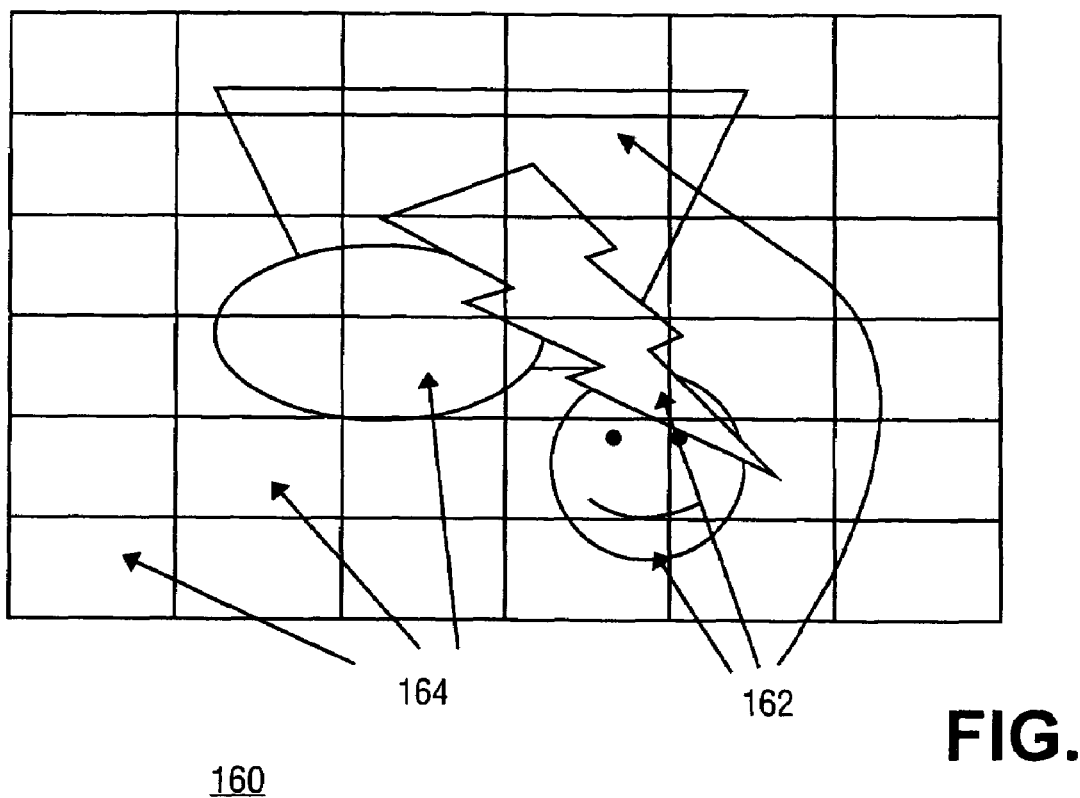
FIG. 3 illustrates a depiction of an embodiment of a zone renderer screen view including zones and geometrical primitives.

FIG. 2 illustrates a block diagram of an embodiment 120 of a graphics device including a graphics-binning engine 120, vertex buffers 150 including first buffer 152 including only vertex X and Y data, graphics-rendering engine 136 and bins 128. FIG. 3 illustrates an embodiment 160 of various screen objects implemented on a zone rendering system 120 (shown in FIG. 2) is illustrated. Referring to FIGS. 2 and 3, a screen object to be presented on the display screen is broken down into graphics primitives 162. Primitives 162 may include, but are not limited to, graphical objects such as polygons (e.g., triangles and quadrilaterals), lines, points and vectors. The graphics engine 106 is implemented to render, or draw, the graphics primitives 162 that represent a view of one or more screen objects being represented on the display screen. In zone rendering, a screen is subdivided into an array of zones 164 commonly screen-space rectangles although other geometric variants may be used as well. Each zone 164 is associated with a bin. Each bin 128 includes a chained series of command buffers 134 stored within non-contiguous physical memory pages. The bins 128 are thus preferably implemented as a chain of independent physical pages.

When a primitive 162 intersects a zone 164, the corresponding primitive instruction is placed in the bin 128 associated with the zone 164 intersected. Per-zone instruction bins 128 are thus used to hold primitive instructions and state-setting instructions required to render each sub-image and are generated by comparing the screen-space extent of each primitive 162 to the array of zones 164. Thus, as the primitives 162 are received, the present invention determines which zone(s) 164 each primitive 162 intersects, and replicates the primitive instructions into a bin 128 associated with each of these zones 164.

The process of assigning primitives (and their attributes) 162 to zones 164 is referred to as binning. "Bin" 128 refers to the abstract buffer used for each zone-where a bin 128 will typically be realized as a series of instruction batch buffers 134. Binning performs the necessary computations to determine what primitives 162 lie in what zones 164 and can be performed by dedicated hardware and/or software implementations.

In one typical implementation, a driver 122 writes out a set of primitive instructions to be parsed by the graphics-binning engine 126. In particular, the information necessary for primitive binning is stored in vertex buffers 150, which includes first buffer 152 and second buffer 154. As discussed in detail below, first buffer 150 stores vertex X and Y data, while second buffer 154 contains the remainder of the vertex data. For each zone 164 intersected by a primitive 162, the graphics-binning engine writes corresponding primitive instructions into buffers 134 associated with the zones 164 intersected. Given the split vertex buffers 152 and 154, graphics binning-engine 126 is now permitted to read and cache only vertex screen X and Y data from first buffer 150. Some primitives 162 will intersect more than one zone 164, in which case the primitive instruction is replicated in bins 128 corresponding to the intersected zones 164. For example, the lightning bolt depicted in FIG. 3 intersects nine zones 164. This process is continued until the entire scene is sorted into bins 128.

Referring to FIG. 2, in a typical implementation, a graphics primitive and state-setting instruction stream, referred to as a scene input list 124, is initially applied to graphics-binning engine ring buffer 125 associated with graphics-binning engine 126. The scene input list 124 may be a single, temporally-ordered scene description as received by the application programming interface (API). Graphics-binning engine 126 is typically implemented as a hardware binning engine (HWB) 126. One skilled in the art will recognize that a software or software plus hardware binner could be used as well. The graphics-binning engine 126 parses scene input list 124 and determines which zone(s) 164 each primitive 162 intersects.

As previously noted, the zones 164 are associated with bins 128. Graphics-binning engine 126 compares the screen-space extent of each primitive 162 to the array of zones 164, and replicates the associated primitive commands into corresponding bins 128. Bins 128 are comprised of chained series of command buffers 134 typically stored within non-contiguous physical memory pages. A bin list is a list of buffers 134 which comprise each bin 132. Pages are initially allocated to the bin memory pool (BMP) 140. The bin pointer list 130 is initialized with the page numbers of the pages and stores write pointers into each bin list 132.

The graphics-binning engine 126 also maintains the current graphics state by parsing associated state-setting instructions contained with the scene input list 124. Prior to placing a primitive command in any given bin 128, the graphics-binning engine 126 typically precedes the primitive command in the bin 128 with any required state-setting instructions.

After the scene input list 124 has been completely parsed, the associated bins (i.e. bin 0, bin 1 . . . bin n–1) are ready to be used by the graphics-rendering engine 136 to render the scene. As discussed in detail below, instructions are included at the end of the scene input list 124 to cause the graphics-binning engine 126 to increment the register in pending scene counter 148 by one and initiate rendering of the binned scene. For example, graphics-binning engine 126 sends a render instruction to graphics-rendering engine ring buffer 157 associated with graphics-rendering engine 136 via path 156.

Once all the primitives 162 are sorted and the command structures completed, a second pass is made to render the scene one zone 164 at a time. Following the first pass of building a bin for each zone 164 intersected by a primitive 162, a second zone-by-zone rendering pass is performed. In particular, the bins 128 for all the zones 164 are rendered to generate the final image, with each scene rendered one zone 164 at a time. The order with which the zones 164 are rendered is typically not significant. All bins 128 associated with primitives 162 that touch pixels within a particular zone 164 are rendered before the next zone 164 is rendered. A single primitive 162 may intersect many zones 164, thus requiring multiple replications. As a result, primitives 162 that intersect multiple zones 164 are rendered multiple times (i.e. once for each zone 164 intersected).

Rendering performance improves as a result of the primitives 162 being sorted by their intersection with zones 164 that are aligned to the render cache 110. Since the graphics device 106 is only working on a small portion of the screen at a time (i.e. a zone 164), it is able to hold the frame buffer contents for the entire zone 164 in a render cache 110. The dimensions of the zone 164 are typically a constant tuned to the size and organization of the render cache 110. It is by this mechanism that the render cache 110 provides optimal benefits—reuse of cached data is maximized by exploiting the spatial coherence of a zone 164. Through use of the zone rendering mode, only the minimum number of color memory writes need be performed to generate the final image one zone 164 at a time, and color memory reads and depth memory reads and writes can be minimized or avoided altogether. Use of the render cache 110 thus significantly reduces the memory traffic and improves performance relative to a conventional renderer that draws each primitive completely before continuing to the next primitive.

Figure 4:
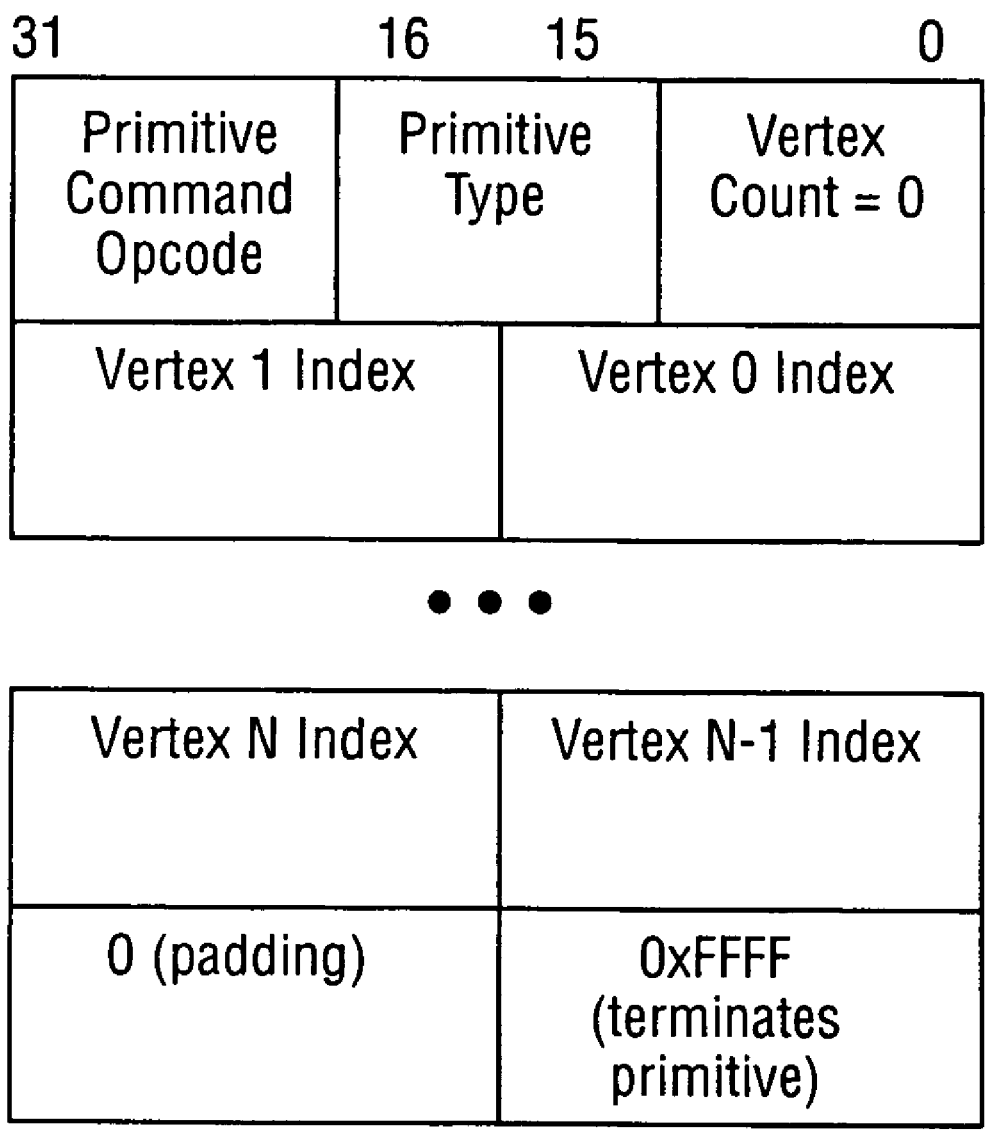
FIG. 4 illustrates a block diagram of an embodiment of a primitive command with variable vertex count.

FIG. 4 illustrates a block diagram of an embodiment 170 of a primitive command with variable vertex count. Embodiments of the present invention provide for efficient object storage for zone rendering. In particular, similar, contiguous primitives to be stored as a single primitive in the zone rendering bins. To enable this, the primitive packet used in the bin is allowed to vary in length and the currently open type of primitive is recorded on a per-bin basis.

The requirement for an explicit vertex count in the object instruction header is eliminated. Instead, a special code is used to specify a variable number of subsequent indices. A special index value of 0xFFFF is reserved to terminate the vertex index sequence. With this mechanism, the hardware is able to start outputting (and possibly replicating) primitive commands into bin lists on the fly without requiring the buffering of the entire primitive. Given the variable nature of the primitive instruction, multiple similar/sequential primitives can be concatenated using a single primitive command header. This reduces the bandwidth and footprint overhead caused by separate primitive instruction headers.

FIG. 5 illustrates a diagram of an embodiment 180 of information stored in a bin pointer list. In order to permit the concatenation of object vertex indices across primitives, the currently open type of primitive (POINTLIST, LINELIST, TRILIST, RECTLIST, or NOT_OPEN) is recorded on a per-bin basis in order to detect changes in primitive type. This information is stored in the bin pointer as illustrated in FIG. 5.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A graphics device, comprising:
   a vertex buffer containing vertex data;
   a plurality of bin buffers, each associated with a different zone on a display device and comprising a chained series of command buffers to store primitive command information; and
   a graphics binning engine programmed to copy vertex data to the plurality of bin buffers when the vertex data is representative of a graphics primitive that intersects the zone associated with the bin buffer.

2. The graphics device as recited in claim 1, wherein the graphics binning engine is programmed to maintain a graphics state by parsing state setting instructions.

3. The graphics device as recited in claim 2, wherein the graphics binning engine is programmed to place the state setting instructions in the bin buffers.

4. The graphics device as recited in claim 1, further comprising a graphics rendering engine for rendering an image on a zone-by-zone basis based on the data in the bin buffers.

5. A system comprising:
   a graphics device having:
      a plurality of vertex buffers including a first buffer to store vertex coordinate data of vertex data and a second buffer to store a remainder of the vertex data;
      a plurality of bin buffers each associated with a zone of a display, each bin buffer to store primitive commands associated with a corresponding zone; and
      a binning engine to read the vertex coordinate data in the first buffer and to write the primitive commands to the bin buffers based on the vertex coordinate data in the first buffer; and
   a processor coupled to the graphics device.

6. The system of claim 5, wherein dimensions of the zone are of a constant value tuned to a size and organization of a render cache.

7. The system of claim 5, wherein at least some of the primitive commands stored in the bin buffers include a variable vertex count.

8. The system of claim 7, wherein the at least some of the primitive commands include a header code to identify a variable number of indices.

9. A method comprising:
   storing first vertex information to a first vertex buffer of a graphics engine and storing second vertex information to a second vertex buffer of the graphics engine, wherein the first vertex information corresponds to vertex coordinate data and the second vertex information corresponds to vertex remainder data of a primitive;
   storing primitive instructions associated with the first vertex information to each of a plurality of bin buffers of the graphics engine corresponding to a display zone that is to be intersected by the primitive; and
   reading the primitive instructions in the plurality of bin buffers to generate an image on a display.

10. The method of claim 9, further comprising storing a zone at a time in a render cache coupled to the graphics engine.

11. The method of claim 9, further comprising storing the primitive instructions with a variable vertex count.

12. The method of claim 11, further comprising storing a header code in the primitive instructions to identify a variable number of indices.

* * * * *